(12) United States Patent
Tsujino et al.

(10) Patent No.: US 12,135,097 B2
(45) Date of Patent: Nov. 5, 2024

(54) FLUID CONTROL DEVICE

(71) Applicant: FUJIKIN INCORPORATED, Osaka (JP)

(72) Inventors: Kengo Tsujino, Osaka (JP); Ryutaro Tanno, Osaka (JP); Hiroto Shibata, Osaka (JP); Akihiro Harada, Osaka (JP); Tomohiro Nakata, Osaka (JP); Tsutomu Shinohara, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 61 days.

(21) Appl. No.: 18/245,788

(22) PCT Filed: Sep. 29, 2021

(86) PCT No.: PCT/JP2021/035950
§ 371 (c)(1),
(2) Date: Mar. 17, 2023

(87) PCT Pub. No.: WO2022/113514
PCT Pub. Date: Jun. 2, 2022

(65) Prior Publication Data
US 2023/0332714 A1 Oct. 19, 2023

(30) Foreign Application Priority Data

Nov. 30, 2020 (JP) .................. 2020-197935

(51) Int. Cl.
*F16K 37/00* (2006.01)
*F16K 11/04* (2006.01)

(52) U.S. Cl.
CPC .......... *F16K 37/0041* (2013.01); *F16K 11/04* (2013.01)

(58) Field of Classification Search
CPC ........................ F16K 37/0041; F16K 11/04
See application file for complete search history.

(56) References Cited

U.S. PATENT DOCUMENTS

| | | |
|---|---|---|
| 2017/0292542 A1 | 10/2017 | Ejiri et al. |
| 2021/0116047 A1 | 4/2021 | Suzuki et al. |
| 2021/0123544 A1 | 4/2021 | Tanno et al. |

FOREIGN PATENT DOCUMENTS

| | | |
|---|---|---|
| JP | 6170635 B2 | 8/2017 |
| JP | 2020085064 A | 6/2020 |
| JP | 2020183799 A | 11/2020 |
| WO | 2018/168872 A1 | 9/2018 |
| WO | 2020/012828 A1 | 1/2020 |

*Primary Examiner* — Kelsey E Cary
(74) *Attorney, Agent, or Firm* — WC&F IP (57) ABSTRACT

Provided is a fluid control device that is compact and that enables data regarding an internal operation of the device to be acquired.
A fluid control device V is disposed in a flow path of a fluid and enables data regarding an internal operation to be acquired, the fluid control device including a sensor hood 44 to which one or more sensors M2 for detecting an operation in the fluid control device are attached; a valve body 1 connected to the sensor hood; a diaphragm 42 held below the sensor hood, inside the valve body; a cover portion 5 that covers the outer periphery of the sensor hood; and a circuit board 60 that is electrically connected to the sensor(s) and for which a thickness direction of the circuit board and a flow path direction are arranged in the same direction on the inside of the cover portion.

7 Claims, 8 Drawing Sheets

FLUID CONTROL DEVICE

TECHNICAL FIELD

The present invention relates to a fluid control device that is equipped with a built-in sensor and that is capable of outputting data detected by the sensor.

BACKGROUND ART

In a film-forming process for forming a thin film on the surface of a semiconductor wafer, miniaturization of the thin film is required, and in recent years, a film-forming method called atomic layer deposition (ALD) for forming a thin film with a thickness at an atomic level or a molecular level has been used.

However, such thin-film miniaturization requires a fluid control device to perform opening and closing operations more frequently than ever, and sometimes the load readily causes fluid leakage and so forth. For this reason, there has been an increased demand for a technique to enable straight-forward detection of fluid leakage in a fluid control device.

In this regard, Patent Literature 1 proposes a valve device that includes an adapter-fixing ring which is fixed in a valve body while pressing a diaphragm and a pressing adapter, which is in contact with the peripheral edge portion of the diaphragm. Patent Literature 2 proposes a fluid control device that includes a hood portion to which a sensor for detecting an operation in the fluid control device is attached, wherein the valve body is provided with a penetrating slit that enables a communication cable connected to the sensor to be guided to the outside, and one end of the slit opposite to a base portion where a flow path is formed is open.

CITATION LIST

Patent Literature

Patent Literature 1: Japanese Patent No. 6170635
Patent Literature 2: WO 2020/012828 A

SUMMARY OF INVENTION

Technical Problem

An object of the present invention is to provide a fluid control device that enables, while being compact, an internal operation of the device to be of acquired.

Solution to Problem

In order to achieve the foregoing object, a fluid control device according to one aspect of the present invention is a fluid control device that is disposed in a flow path of a fluid and that enables data regarding an internal operation to be acquired, the fluid control device including: a sensor hood to which one or more sensors for detecting an operation in the fluid control device are attached; a valve body connected to the sensor hood; a diaphragm held below the sensor hood, on the inside of the valve body; a cover portion that covers the outer periphery of the sensor hood; and a circuit board that is electrically connected to the sensor(s) and for which a thickness direction of the circuit board and a flow path direction are arranged in the same direction on the inside of the cover portion.

The circuit board may be disposed on an upstream side or a downstream side of the sensor hood, on the inside of the cover portion.

In the valve body, an inlet port through which the fluid flows in, an outlet port through which the fluid flows out, and a fixing portion that fixes the fluid control device in the flow path may be formed on the same straight line.

A groove connecting the inside and the outside of the cover portion may be formed in an upper section of the cover portion, and a cable connected to the circuit board may be inserted into the groove and guided out in a vertical direction.

The fluid control device may further include: a light-emitting unit that blinks in response to opening and closing of the diaphragm; and a stem that slides inside the sensor hood and that opens and closes the diaphragm in response to the sliding, wherein the light-emitting unit may be connected to the circuit board and disposed in a position facing the circuit board, with the stem interposed therebetween.

The outer peripheral surface of the sensor hood may have a shape obtained by cutting out part of a cylindrical surface to form a planar surface, and the sensor attachment portion to which the sensor is connected may be disposed on the planar surface.

The circuit board may include at least a central portion and a first end to which the sensor is connected, and the central portion and the first end may be connected to each other by a flexible arm.

Advantageous Effects of Invention

The fluid control device of the present invention enables, while being compact, data regarding an internal operation of the device to be acquired.

BRIEF DESCRIPTION OF DRAWINGS

FIG. 1(a) is an external plan view, FIG. 1(b) is a front view.

DESCRIPTION OF EMBODIMENTS

Hereinafter, a fluid control device according to an embodiment of the present invention will be described with reference to the drawings. In each drawing, a flow path direction is a y direction, a direction orthogonal to the flow path direction, that is, a width direction of a fluid control device V is an x direction, and a vertical direction is a z direction.

The fluid control device V according to the present embodiment is an air-operated direct diaphragm valve that incorporates a sensor for detecting an internal operation of the fluid control device V and that executes wired communication with other terminals and the like.

Note that the other terminals mentioned here include, in addition to a so-called computer such as a server, other devices and apparatuses such as another fluid control device and another flow rate control apparatus.

Figure 6A:
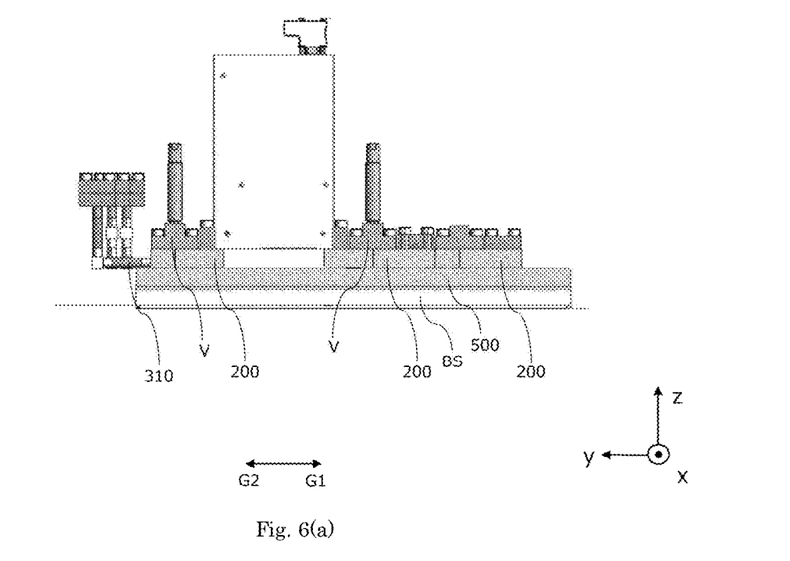
FIG. 6(a) is a front view and FIG. 6(b) is a right side view illustrating an example of a fluid control apparatus that uses the fluid control device according to the present embodiment.
Figure 6B:
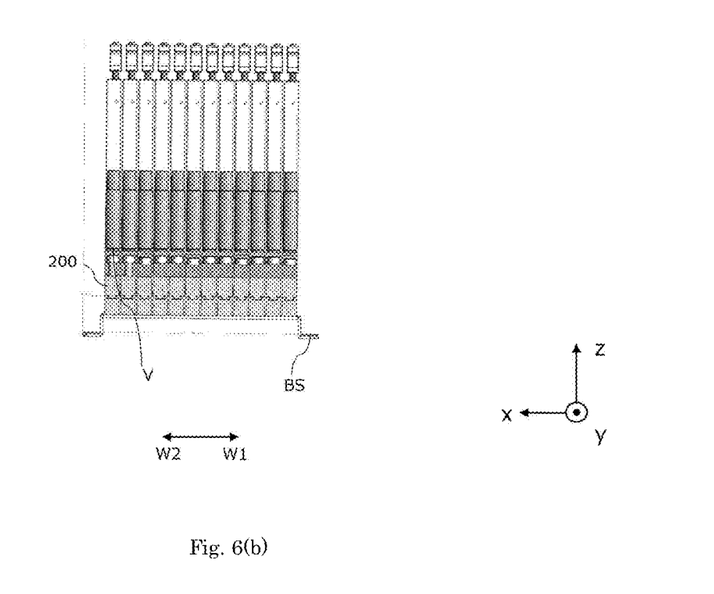

First, an example of a fluid control apparatus to which the present invention is applied will be described with reference to FIG. 6. In the fluid control apparatus illustrated in the drawing, rail members 500 arranged along the width direction (x direction) and extending in the longitudinal direction (y direction) are provided on the base plate BS. Note that the −x direction indicates the front side, the +x direction indicates the rear side, the −y direction indicates the downstream side, and the +y direction indicates the upstream side. In each rail member 500, various fluid devices V are arranged via a plurality of flow path blocks 200, and respective flow paths (not illustrated) through which fluid flows from the upstream side toward the downstream side are formed by the plurality of flow path blocks 200.

Here, a "fluid device" is a device used in a fluid control apparatus for controlling the flow of fluid, and is a device that is equipped with a body that defines a fluid flow path and that has at least two flow path ports which are open in the surface of the body. Specific examples thereof include an on-off valve (two-way valve), a regulator, a pressure gauge, an on-off valve (three-way valve), and a mass flow controller, but are not limited thereto. Further, an introduction pipe 310 is connected to a flow path port on the upstream side of the above-described flow path (not illustrated). In this fluid control apparatus, twelve flow paths flowing in the +y direction are formed in each of the twelve rail members 500, and the length of each flow path in the width direction (x direction) is 10 mm or less, that is, the width (dimension) of each fluid device is 10 mm or less.

As illustrated in FIGS. 1 to 4, the fluid control device V according to the present embodiment is a device that enables data regarding an internal operation to be acquired, and is mainly equipped with a valve body 1, a casing 3, a hood portion 4, and a cover portion 5.

Valve Body 1

Figure 1A:
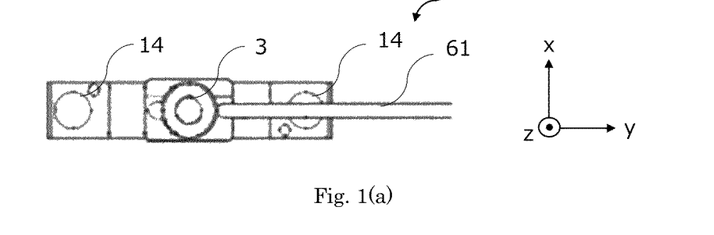
Figure 1B:
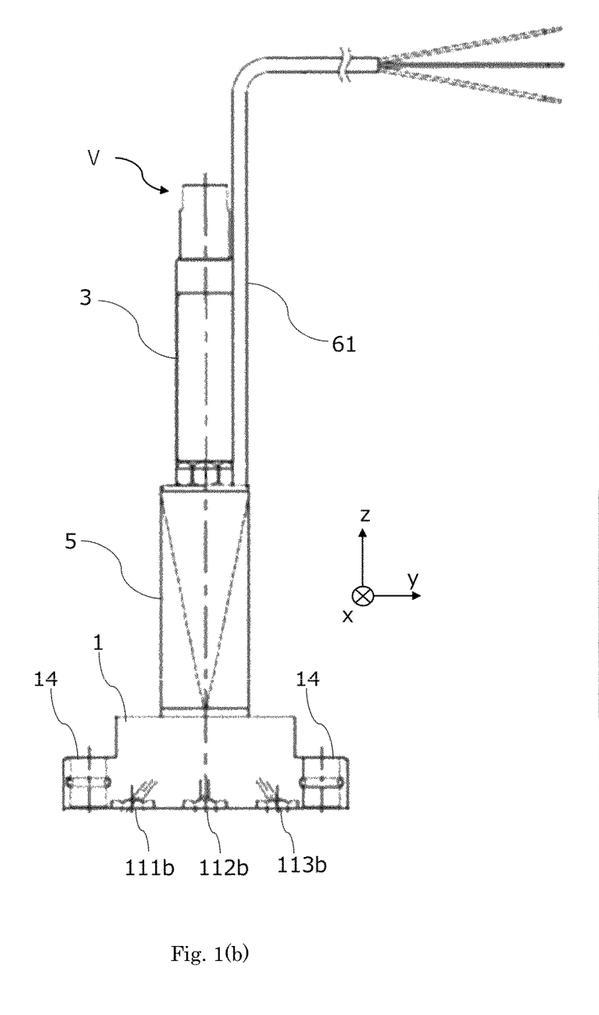
Figure 1C:
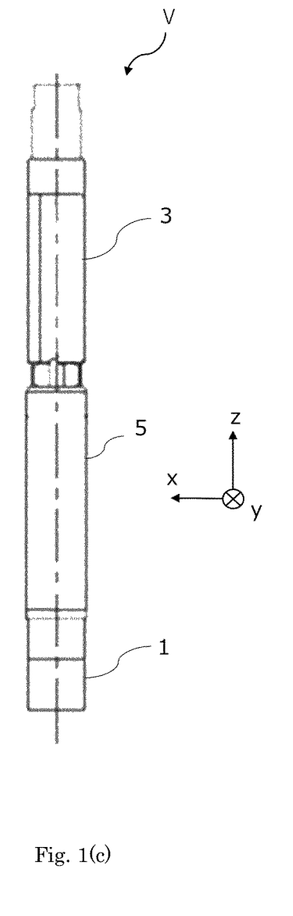
FIG. 1(c) is a right side view showing a fluid control device according to an embodiment of the present invention.
Figure 2:
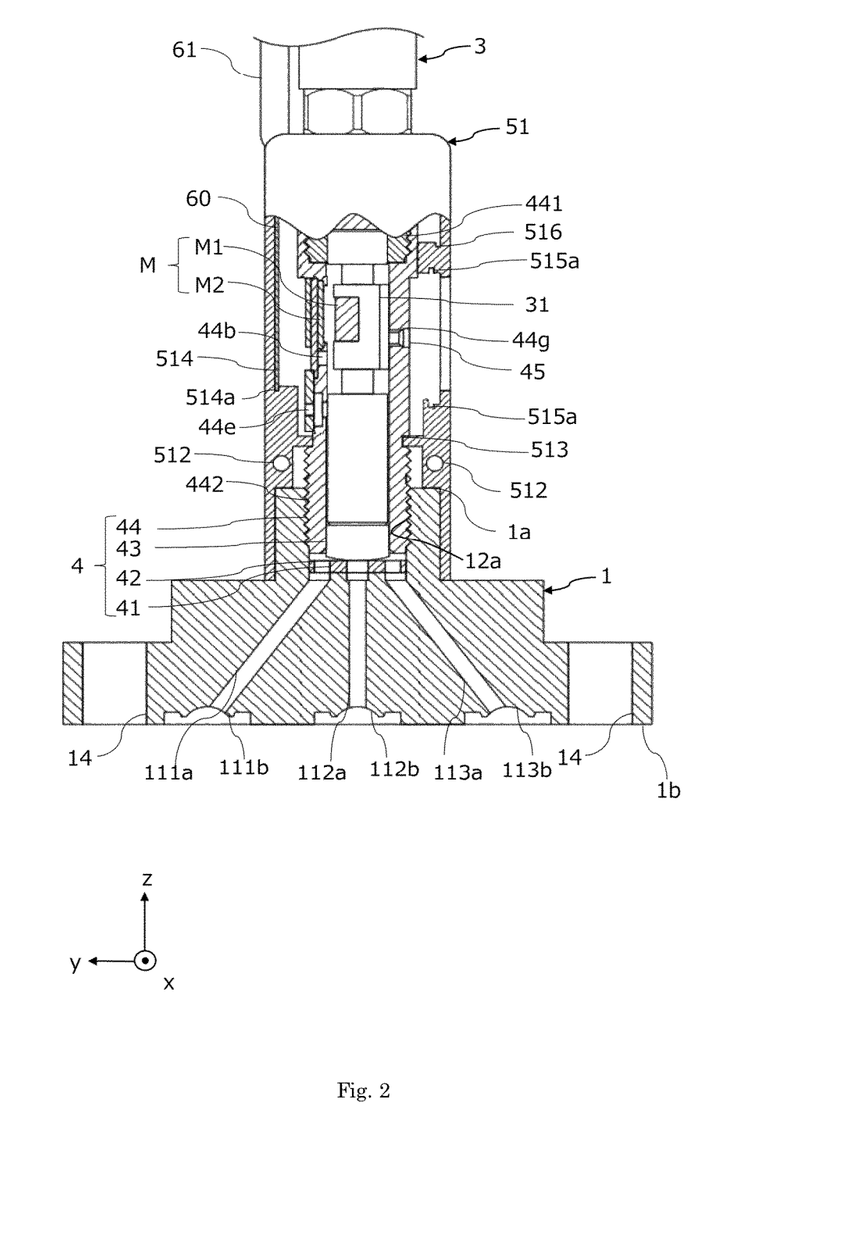
FIG. 2 is an enlarged partial longitudinal sectional view showing the internal structure of the fluid control device according to the present embodiment as viewed from the rear side.

As illustrated in FIGS. 1 and 2, the valve body 1 is a block-shaped member in which a flow path is formed. The valve body 1 has a stepped shape on both sides in a yz plan view, and the length in the flow path direction (y direction) gradually narrows. The valve body 1 defines a first flow path 111a, a second flow path 112a, and a third flow path 113a for the fluid, which are open in a bottom surface 1b. The first flow path 111a is disposed on the upstream side of the flow path in which the fluid control device V is disposed, and the third flow path 113a is disposed on the downstream side of the flow path in which the fluid control device V is disposed. That is, the first flow path 111a is an inlet path, the third flow path 113a is an outlet path, the opening of the first flow path 111a on the bottom surface 1b is an example of an inlet port, and the opening of the third flow path 113a is an example of an outlet port. Further, a virtual straight line connecting the opening of the first flow path 111a and the opening of the third flow path 113a is equivalent to the direction of the flow path in which the fluid control device V is disposed.

Recessed holding portions 111b, 112b, and 113b for holding a seal member (not illustrated) are formed around the openings in the bottom surface 1b of the first to third flow paths 111a to 113a. The first to third flow paths 111a to 113a communicate with each other in a valve chamber that leads to an opening on the side opposite to the bottom surface 1b side.

The bottom surface 1b of the valve body 1 is fixed atop a board or a manifold block in a case where a unitized fluid control apparatus is constituted by a plurality of fluid control devices V. The upper end of the valve body 1 is held by, and connected to, the cover portion 5. A screw hole 12a connected to the sensor hood 44 is formed in the upper end of the valve body 1 in a vertical direction.

Two through-holes 14 are formed in the bottom surface 1b of the valve body 1 such that the screw hole 12a is sandwiched therebetween. A fixing member, for example, a fastening bolt, for fixing the valve body 1 onto the flow path block 200 as illustrated in FIG. 6 is inserted into the through-holes 14. That is, the two through-holes 14 are examples of fixing portions. The two through-holes 14 are arranged side by side along the flow path direction on the upstream side and the downstream side of a diaphragm 42 in the flow path direction. In other words, the opening (inlet port) of the first flow path 111a, the opening (outlet port) of the third flow path 111c, and the two through-holes 14 of the valve body 1 are formed on the same straight line. With this configuration, in comparison with a configuration in which the through-holes 14 are formed in positions different from positions on the virtual straight line passing through the inlet and the outlet of the valve body 1, the thickness in the direction orthogonal to the flow path direction of the fluid control device V, that is, in the width direction can be reduced. As a result, as illustrated in FIG. 6, even in a case where a plurality of fluid control devices V are stacked in parallel in the width direction to constitute the fluid control apparatus, the fluid control apparatus can be made compact.

Casing 3

As illustrated in FIGS. 1 and 2, the casing 3 has a cylindrical shape overall, and incorporates an actuator (not illustrated). The actuator can be a piston driven by compressed air or the like, for example; however, various actuators such as a manual actuator, a piezoelectric actuator, and a solenoid actuator can otherwise be adopted. The casing 3 incorporating the actuator may constitute part of the actuator or may be separate from the actuator. The casing 3 is fixed atop the valve body 1 via a sensor hood 44.

Figure 3:
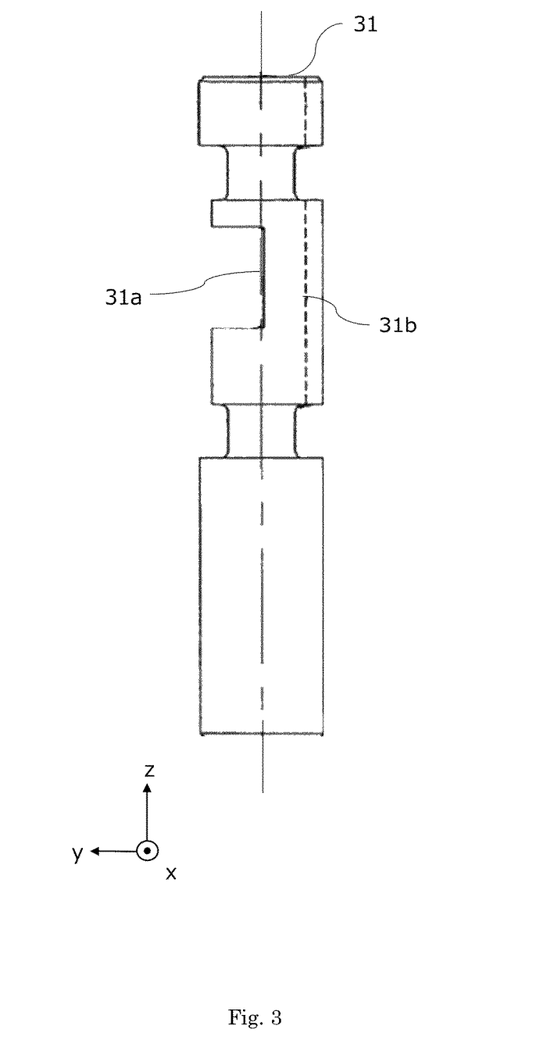
FIG. 3 is a front view illustrating a stem included in the fluid control device according to the present embodiment.

As illustrated in FIG. 3, inside the sensor hood 44 there is a stem 31 driven in the up-down direction (z direction) by the actuator incorporated in the casing 3.

The stem 31 is a substantially tubular member having two constricted sections. Between the two constricted sections, a notch portion 31a is formed which is notched as far as substantially the center in the radial direction. The notch portion 31a is a magnetic body attachment portion to which a magnetic body M1 facing a magnetic sensor M2 is attached. The magnetic body M1 attached to the notch portion 31a slides up and down together with the stem 31.

Further, a key groove 31b along the longitudinal direction (z direction) is formed in the stem 31. A screw 45 inserted through the through-hole 44g of the sensor hood 44 is inserted into the key groove 31b. When the stem 31 tries to rotate, the screw 45 and the side wall of the key groove 31b abut against each other and prevent the rotation. Because the key groove 31b is formed in the sliding direction of the stem 31 with respect to the sensor hood 44, the screw 45 slides up and down along the key groove 31b. That is, with this configuration, mutual rotation between the stem 31 and the sensor hood 44 is restricted. As a result, because the circumferential positional relationship between the magnetic body M1 fixed to the stem 31 and the magnetic sensor M2 fixed to the sensor hood 44 is restricted, the up-and-down movement of the stem 31 can be reliably detected by the magnetic sensor M2.

As illustrated in FIG. 2, a diaphragm presser 43 is connected to the lower end of the stem 31. Further, the diaphragm 42 is held inside the valve body 1, below the diaphragm presser 43. The lower surface side of the diaphragm presser 43 is a downward-bulging convex surface, and the lower surface side thereof abuts on a central portion of the diaphragm 42 to press the diaphragm 42 in conjunction with the sliding stem 31.

Hood Portion 4

The hood portion 4 is a member that is housed inside the cover portion 5, that has the stem 31 inserted therethrough, and that holds the magnetic sensor M2.

The hood portion 4 is mainly equipped with a seat 41, the diaphragm 42, the diaphragm presser 43, and the sensor hood 44.

The annular seat 41 is provided at a peripheral edge of a section where the first to third flow paths 111a to 113a communicate with each other. On the seat 41, there is provided a diaphragm 42 that causes a fluid to flow from the first to third flow paths 111a to 113a or blocks the flow by being brought into contact with or separated from the seat 41.

The diaphragm 42 is a spherical, shell-shaped member made of a metal such as stainless steel or a Ni—Co-based alloy, or of a fluorine-based resin and having a central portion that bulges out in a convex shape, and separates the flow paths from a space where the actuator is operated. If air as a driving pressure is supplied to the diaphragm 42 and same is released from the pressing by the diaphragm presser 43, the central portion of the diaphragm is displaced in a direction away from the seat 41 by its own restoring force or the pressure in the flow path and is separated from the seat 41. As a result, the valve chamber is opened, and the first to third flow paths 111a to 113a communicate with each other. However, if the supply of air as a driving pressure is stopped and the diaphragm 42 is pressed by the diaphragm presser 43, the central portion of the diaphragm 42 is displaced in the direction of abutment on the seat 41 and abuts on the seat 41. As a result, the valve chamber is blocked, and the first to third flow paths 111a to 113a are blocked from each other.

The diaphragm presser 43 is provided above the diaphragm 42, is supported by the sensor hood 44 so as to be movable up and down, and presses the central portion of the diaphragm 42 in conjunction with the sliding stem 31.

Figure 4A:
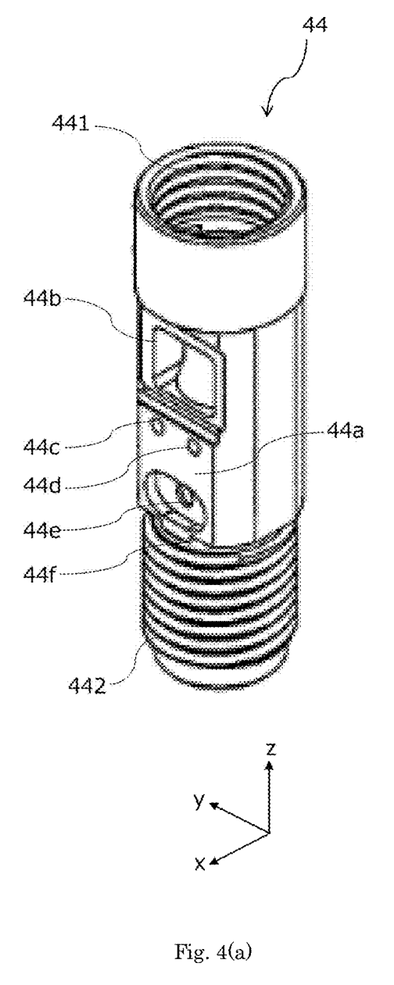
FIG. 4(a) is a perspective view of a hood portion included in the fluid control device according to the present embodiment as viewed from the front side.
Figure 4B:
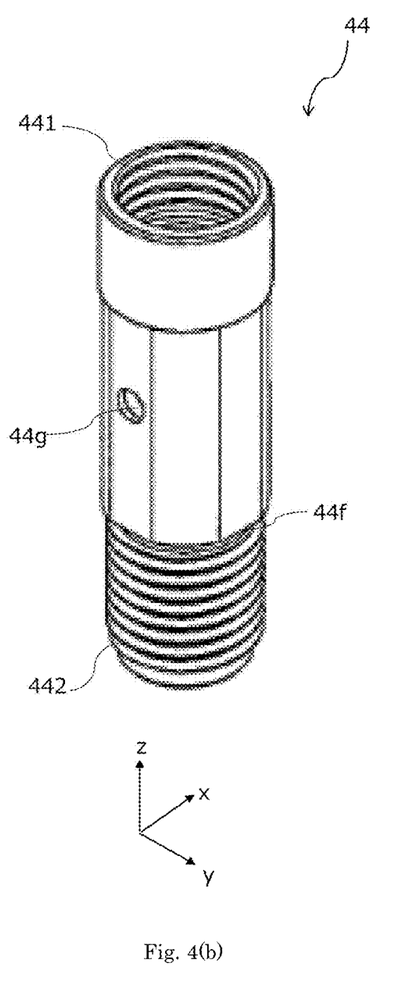
FIG. 4(b) is a perspective view of the hood portion as viewed from the rear side.

As illustrated in FIG. 4, the sensor hood 44 has a substantially cylindrical shape, covers the valve chamber, and is housed inside the cover portion 5. A screw portion 441 is formed on the inside of an upper portion (+z direction) of the sensor hood 44 in the longitudinal direction, and the casing 3 is screwed in. A screw portion 442 is formed on the outside of a lower portion (−z direction) of the sensor hood 44 in the longitudinal direction, and is screwed into the screw hole 12a of the valve body 1.

As illustrated in FIG. 4(a), at least part of the central portion of the sensor hood 44 in the longitudinal direction (z direction), that is, at least part of the portion excluding the screw portions 441 and 442 has a cylindrical surface partially cut out in a planar shape to form a planar surface 44a.

Formed on the planar surface 44a are a sensor attachment portion 44b, a pair of screw holes 44c and 44d, and an opening 44e. The sensor attachment portion 44b is a hole that penetrates the sensor hood 44 and in which the magnetic sensor M2 is fitted. The magnetic sensor M2 has, for example, a substantially rectangular parallelepiped shape. Further, the magnetic sensor M2 faces the magnetic body M1 disposed on the stem 31, and the magnetic sensor M2 is capable of detecting the open/close state of the diaphragm 42 according to the positional relationship with the magnetic body M1. Note that the magnetic body M1 may be a magnet.

Note that the magnetic sensor M2 is an example of a sensor, and may be another type of sensor.

With a configuration in which the sensor attachment portion 44b is formed on the planar surface 44a cut out in a planar shape, when the magnetic sensor M2 is disposed on the outer peripheral surface side of the sensor hood 44, the magnetic sensor M2 does not protrude in the radial direction of the sensor hood 44. Because the sensor hood 44 is fixed to the valve body 1 by being screwed in, the position of the magnetic sensor M2 on the sensor hood 44 varies for each individual piece in mass production, and cannot be determined. However, with the above configuration, no matter where the sensor attachment portion 44b is disposed, the magnetic sensor M2 does not protrude in the width direction. That is, the thickness of the fluid control device V in the width direction can be reduced to about 10 mm, for example.

A sealing material such as packing is disposed on the outer periphery of the sensor attachment portion 44b. With a configuration in which the attachment surface of the sensor is the flat, planar surface 44a, warping of the circuit board of the sensor can be prevented in comparison with the configuration in which the attachment surface of the sensor is a cylindrical surface.

Screws for fixing a board (a first end to be described subsequently) that holds the magnetic body M1 are screwed into the screw holes 44c and 44d. The opening 44e is an opening in which another sensor such as a pressure sensor or an acoustic sensor can be attached.

Between the screw portion 442 and the cylindrical surface of the sensor hood 44 is a constricted portion 44f, and the fitting portion 513 of the first cover 51 is fitted thereto.

Cover Portion 5

Figure 5A:
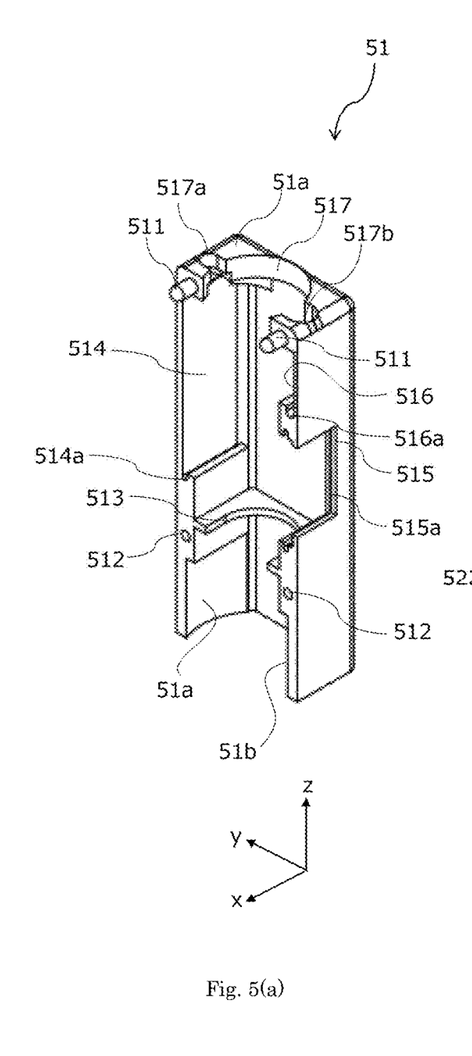
FIG. 5(a) is a perspective view of a first cover included in the fluid control device according to the present embodiment.
Figure 5B:
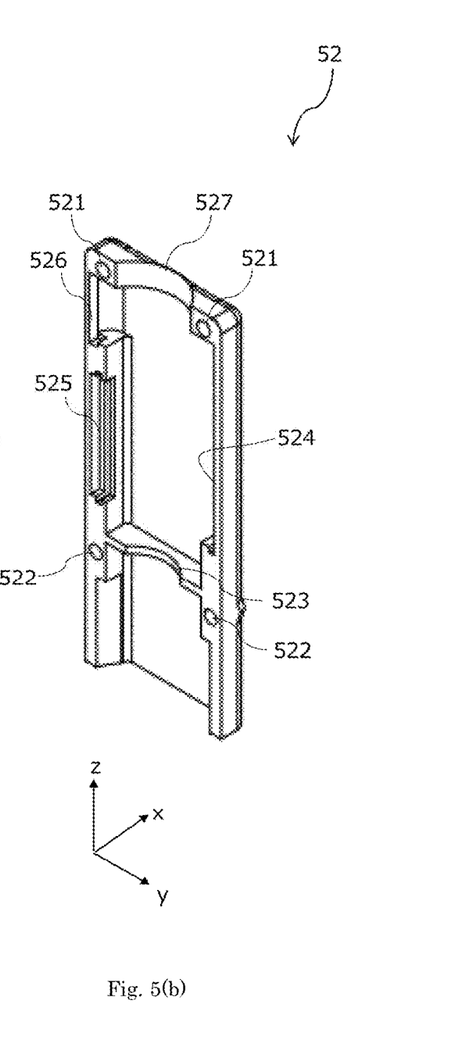
FIG. 5(b) is a perspective view of a second cover.

As illustrated in FIGS. 1, 2, and 5, the cover portion 5 mainly includes a first cover 51 and a second cover 52. The first cover 51 and the second cover 52 are connected to each other so as to cover the hood portion 4 and constitute a holding unit that holds the circuit board 60.

As illustrated in FIG. 5(a), the first cover 51 is a substantially rectangular parallelepiped member the front surface and bottom surface of which are open. A pair of protrusions 511 protrudes from the left and right upper ends of the first cover 51, and the protrusions 511 are inserted, in the assembled state, into a pair of holes 521 drilled in the upper end of the second cover 52 (see FIG. 5(b)). In addition, a pair of holes 512 is provided on substantially the same plane as the protrusion 511, in the vicinity of a fitting portion 513 (described subsequently) of the first cover 51. A fitting member (not illustrated) such as a screw protrudes from the hole 512, and the fitting member is connected to the pair of holes 522 of the second cover 52. In this manner, the first cover 51 and the second cover 52 are connected by the protrusion 511, the hole 521, the fitting member, and the hole 522.

A fitting portion 513 is formed below the center of the first cover 51 in the longitudinal direction (z direction). The fitting portion 513 is a flat plate which is connected to the inner wall of the first cover 51 on three sides and which has a substantially U-shaped notch on an opened end side. This notch corresponds to the outer periphery of the constricted portion 44f of the sensor hood 44 such that the sensor hood 44 abuts on the fitting portion 513.

A board housing portion 514 is formed on a side wall 51a on the −x side of the first cover 51. The board housing portion 514 is a gap formed by reducing the thickness of part of the side wall 51a. Further, formed at the lower end of the board housing portion 514 is a groove 514a obtained by cutting out the inner wall in the longitudinal direction (−z direction). The circuit board 60 is fitted into the board housing portion 514, and the circuit board 60 is housed inside the cover portion 5. Furthermore, the circuit board 60 is fitted into the groove 514a, and is fixed in a position relative to first cover 51. Additionally, at the upper end of the board housing portion 514, a groove corresponding to the thickness of the circuit board 60 is also formed in at least part of the side wall 51a in the y direction so that the circuit board 60 can be held. With such a configuration, the fluid control device V can be configured to be compact in comparison with a configuration in which the circuit board is disposed further outside the cover portion covering the outside of the sensor hood.

In the case of the circuit board 60, the flow path direction of the flow path in which the fluid control device V is disposed and the thickness direction of the circuit board 60 are arranged in the same direction on the inside of the first cover 51. That is, the planar surface of the circuit board 60 and the flow path direction are substantially orthogonal to each other. Further, the circuit board 60 is disposed above the valve body 1 and upstream or downstream of the sensor hood 44.

Figure 7A:
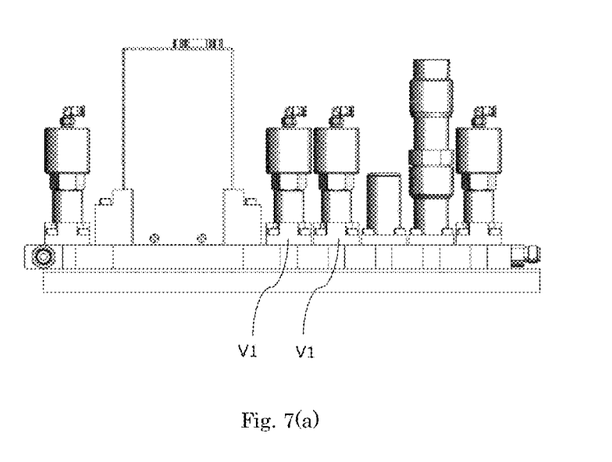
FIG. 7(a) is a front view and FIG. 7(b) is a right side view illustrating an example of a fluid control apparatus that uses a fluid control device of the related art.
Figure 7B:
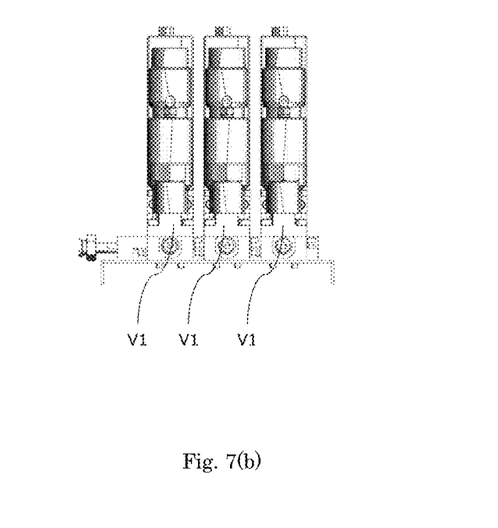

Here, in the fluid control apparatus of the related art illustrated in FIG. 7, the circuit board of the sensor built into the fluid control device V1 is disposed on the outside of the cover that covers the sensor hood. The fluid control device V1 has a larger outer diameter and a larger width than the outer diameter and width of the fluid control device V according to the present invention. Therefore, in a case where a plurality of the fluid control devices V1 are arranged side by side, the fluid control apparatus becomes large.

In contrast, in the fluid control device V according to the present invention, the circuit board 60 is housed on the inside of the cover portion 5, and the circuit board 60 does not protrude in the width direction of the fluid control device V. Therefore, even when a plurality of fluid control devices V are arranged side by side in the width direction to constitute the fluid control apparatus, the apparatus can be made compact.

An opening 515 cut out in a substantially rectangular shape is provided in a −y-side side wall 51b facing the side wall 51a. Further, in the opening 515, a groove 515a is formed along three end sides forming the opening 515, and a flat plate-shaped member can be fitted therein. Due to this groove 515a, for example, another sensor can be disposed in the opening 515.

Further, a light-emitting unit housing portion 516 is formed in the side wall 51b. The light-emitting unit housing portion 516 is a gap formed by reducing the thickness of part of the side wall 51b. Formed at the lower end of the light-emitting unit housing portion 516 is a groove 516a obtained by cutting out the inner wall in the longitudinal direction (z direction). A light-emitting element is housed in the light-emitting unit housing portion 516. The light-emitting element is an LED element, for example, and serves as an on-off display that is held by a circuit board (a second end to be described subsequently) which energizes the element, and that blinks in response to opening and closing of the diaphragm 42. The circuit board of the light-emitting element is fitted into the light-emitting unit housing portion 516 and is fitted into the groove 516a. The light-emitting unit housing portion 516 faces the board housing portion 514, and in the assembled state, the circuit board 60 housed in the board housing portion 514 and the light-emitting unit 62 face each other with the stem 31 and the sensor hood 44 interposed therebetween. The light-emitting element is disposed on the circuit board such that a light beam extends upward.

A recess 517 cut out in a substantially U shape is formed in a wall 51c forming an upper portion of the first cover 51. The recess 517 has a shape corresponding to the outer peripheral surface of the casing 3. A first groove 517a cut out toward the side wall 51a is formed in the inner peripheral surface of the recess 517. The first groove 517a is located above the board housing portion 514, and a cable 61 (see FIG. 1) extending from the circuit board 60 housed in the board housing portion 514 is inserted into the first groove 517a. The cable 61 is a communication cable, for example. With a configuration in which the cable 61 is guided upward by the first groove 517a and is guided out in the height direction (vertical direction, +z direction) of the fluid control device V, the cable 61 does not extend to the side of the fluid control device V. In other words, the cable 61 is guided out in a direction different from the side-by-side direction even in a case where the plurality of fluid control devices V are arranged side by side to face the flow path. With this configuration, even in a case where the plurality of fluid control devices V are arranged side by side in the width direction (x direction) and integrated to constitute the fluid control apparatus as illustrated in FIG. 6, a space for wiring the cable 61 in the width direction is unnecessary, and the fluid control apparatus can be made compact. In addition, because the cable 61 extends straight upward without bending, the cable 61 is less likely to be damaged by being bent and so forth.

Further, a second groove 517b cut out toward the side wall 51b is formed in the inner peripheral surface of the recess 517. The second groove 517b is formed above the light-emitting unit housing portion 516 and on the optical path of the light-emitting element housed in the light-emitting unit housing portion 516, and the light flux from the light-emitting element passes through the second groove 517b and is radiated to the outside of the cover portion 5. With this configuration, the operation status of the fluid control device V can be checked from above.

As illustrated in FIG. 5(b), the second cover 52 is a flat plate-shaped member having a shape corresponding to the first cover 51. As described above, the second cover 52 is connected to the first cover 51 by the holes 521, 521, 522, and 522, and forms, together with the first cover 51, a box-shaped body with the upper and lower sides opened. A fitting portion 523 is formed in a position corresponding to the fitting portion 513 in the central portion of the second cover 52 in the longitudinal direction (z direction), and holds the sensor hood 44 together with the fitting portion 513. In an xz plan view, the second cover 52 has ribs extending over an upper end surface and the left and right end sides. In the drawing, a groove 525 is disposed in a position corresponding to the opening 515, in the rib on the right end side (+y side). Further, a board housing portion 524 is disposed in a position corresponding to the board housing portion 514. The light-emitting unit housing portion 516 is disposed in a position corresponding to the light-emitting unit housing portion 526, in the rib on the left end side (−y side). A recess 527 is formed in the rib on the upper end side of the second cover 52, and runs along part of the outer peripheral surface of the casing 3 together with the recess of the first cover 51.

Circuit Board 60

The circuit board 60 is electrically connected to at least the magnetic body M1 and the light-emitting element, and outputs information detected by the magnetic sensor M2 to the outside via the cable 61. Note that, instead of or in addition to the foregoing, the circuit board 60 may include a circuit that realizes a wireless communication function, and may transmit a detection signal from the magnetic sensor M2 to the outside using wireless communication.

Figure 8:
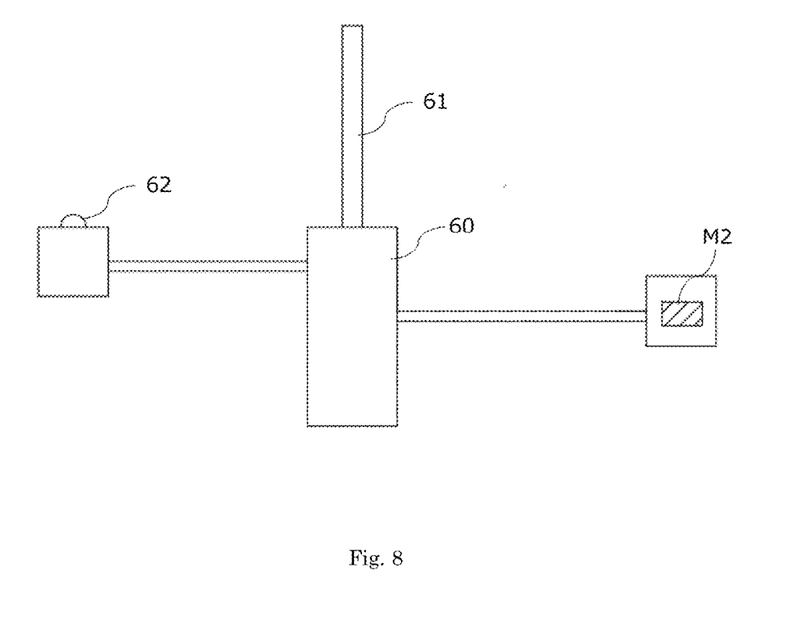
FIG. 8 is a front view illustrating a circuit board included in the fluid control device according to the present embodiment.

As illustrated in FIG. 8, the circuit board 60 includes a central portion held by the cover portion 5, a first end to which the magnetic sensor M2 is connected and which is held by the sensor hood 44, and a second end to which the light-emitting unit 62 is connected and which is held by the cover portion 5. The magnetic sensor M2 constitutes a magnetic sensor unit M together with the magnetic body M1.

The cable 61 is connected to the central portion. The central portion, the first end, and the second end are integrally formed by one flexible board.

The central portion and the first end, and the central portion and the second end are respectively connected by an arm made of a circuit board having a width narrower than that of the first end or the second end, and a copper foil that causes conduction in the central portion, the first end, and the second end is disposed on each arm. The arm extends along the circumferential direction of the sensor hood 44 from an end side along the longitudinal direction (vertical direction in the assembled state) of the central portion. Note that two arms may extend from the end sides in mutually opposite positions, or may extend from the same end side. The two arms may extend from different positions in the longitudinal direction. The configuration may also be such that the first end and the second end may be connected directly without the central portion being interposed therebetween. The arms may have any configuration as long as there is mutual conduction between the central portion, the first end, and the second end, and may be a cable or the like instead of a circuit board.

The circuit board 60 is configured from a flexible thin plate. That is, the arms are flexible in the circumferential direction of the sensor hood 44 in the assembled state. Here, because the sensor hood 44 and the valve body 1 are fixed by being screwed in, the position of the sensor hood 44 in the circumferential direction with respect to the cover portion 5 varies for each individual piece. That is, the distance between the board housing portion 514 that holds the board in the cover portion 5 and the sensor attachment portion 44b that holds the first end in the sensor hood 44 varies for each individual piece. In contrast, with a configuration in which at least the central portion of the circuit board 60 and the first end are connected by a flexible arm, it is possible to absorb variations in the distance between the board housing portion 514 and the sensor attachment portion 44b by appropriately bending and assembling the arms.

With a configuration in which the central portion and the second end are connected by a flexible arm, the second end can be smoothly assembled in the light-emitting unit housing portion 516 by bending the arm along the outer periphery of the sensor hood 44.

A fluid control device V having such a configuration enables, while being compact, an internal operation of the fluid control device V to be acquired.

Note that the fluid control device V according to the present embodiment described above includes the magnetic body M1 and the magnetic sensor M2, but is not limited to this configuration, and may include different types of sensors. The various data detected by the sensors can be information for ascertaining the opening and closing operation of the valve, leakage due to damage, or the like, to the diaphragm 42, aging deterioration or individual differences in the fluid control device V, and the like.

REFERENCE SIGNS LIST

1 Valve body
3 Casing
4 Hood portion
41 Seat
42 Diaphragm
43 Diaphragm presser
44 Sensor hood
5 Cover portion
51 First cover
52 Second cover
60 Circuit board
61 Cable

The invention claimed is:

1. A fluid control device that is disposed in a flow path of a fluid and that enables data regarding an internal operation to be acquired, the fluid control device comprising:
 a cylindrical sensor hood to which one or more sensors for detecting an operation in the fluid control device are attached;
 a valve body connected to the sensor hood;
 a diaphragm held below the sensor hood, inside the valve body;
 a box-shaped cover portion that covers the outer periphery of the sensor hood; and
 a circuit board that is electrically connected to the sensor(s),
 wherein the longitudinal direction of the valve body runs along the flow path direction in a state where the valve body is disposed in the flow path,
 wherein fitting portions are formed as a pair in positions facing each other on an inside of side walls of the cover portion that run along the longitudinal direction of the valve body,
 wherein the sensor hood abuts on the pair of fitting portions,
 wherein the circuit board is configured such that a thickness direction of the circuit board and the longitudinal direction of the valve body are arranged in the same direction on a inside of the cover portion,
 wherein the circuit board is housed along the side walls of the cover portion, and
 wherein the cover portion and the circuit board are arranged on an inside of the valve body in a width direction.

2. The fluid control device according to claim 1, wherein the circuit board is disposed on an upstream side or a downstream side of the sensor hood, on the inside of the cover portion.

3. The fluid control device according to claim 1, wherein, in the valve body,
 an inlet port through which the fluid flows in,
 an outlet port through which the fluid flows out, and
 a fixing portion that fixes the fluid control device in the flow path are formed on a same straight line.

4. The fluid control device according to claim 1, wherein a groove connecting the inside and an outside of the cover portion is formed in an upper section of the cover portion, and
  wherein a cable connected to the circuit board is inserted into the groove and guided out in a vertical direction from an upper surface of the cover portion.

5. The fluid control device according to claim 1, further comprising:
  a light-emitting unit that blinks in response to opening and closing of the diaphragm; and
  a stem that slides inside the sensor hood and that opens and closes the diaphragm in response to the sliding,
  wherein the light-emitting unit is connected to the circuit board and is disposed in a position facing the circuit board, with the stem interposed therebetween,
  wherein the circuit board includes at least a central portion and a second end to which the light-emitting unit is connected, and the central portion and the second end are connected to each other by a flexible arm,
  wherein a light-emitting unit housing portion for housing the light-emitting unit, and a board housing portion for housing the central portion are formed on the side walls of the cover portion so as to face each other with the sensor hood interposed therebetween,
  wherein a cable is connected to the central portion, and the cable is upwardly guided out in a vertical direction via a groove formed above the board housing portion, and
  wherein the light-emitting unit is disposed at the second end such that a light beam extends upward.

6. The fluid control device according to claim 1, wherein an outer peripheral surface of the sensor hood has a shape obtained by cutting out part of a cylindrical surface to form a planar surface, and a sensor attachment portion to which the sensor is connected is disposed on the planar surface.

7. The fluid control device according to claim 1, wherein the circuit board includes at least a central portion and a first end to which the sensor is connected, and the central portion and the first end are connected to each other by a flexible arm.

* * * * *